United States Patent [19]
Redmore

[11] 3,888,626
[45] June 10, 1975

[54] USE AS CORROSION INHIBITORS: PHENANTHRIDINE PHOSPHONIC COMPOUNDS

[75] Inventor: Derek Redmore, Ballwin, Mo.

[73] Assignee: Petrolite Corporation, St. Louis, Mo.

[22] Filed: Aug. 10, 1973

[21] Appl. No.: 387,290

Related U.S. Application Data

[60] Continuation-in-part of Ser. No. 173,296, Aug. 19, 1971, Pat. No. 3,755,057, which is a division of Ser. No. 801,856, Feb. 24, 1969, Pat. No. 3,673,196.

[52] U.S. Cl. ........... 21/2.5 A; 21/2.7 A; 252/8.55 E; 252/146; 252/148; 252/151; 252/389 A
[51] Int. Cl. ... C23f 11/16; C23f 11/00; C23f 11/04
[58] Field of Search ........... 252/389 A, 8.55 E, 146, 252/148, 151; 106/14; 260/283 P, 297 P, 286 A; 21/2.5 A, 2.7 A

[56] References Cited
UNITED STATES PATENTS

| | | | |
|---|---|---|---|
| 2,957,931 | 10/1960 | Hamilton et al. | 260/283 P UX |
| 3,216,894 | 11/1965 | Lorenz et al. | 260/283 P |
| 3,591,330 | 7/1971 | Redmore | 21/2.5 A |
| 3,664,807 | 5/1972 | Redmore | 21/2.5 A |
| 3,673,196 | 6/1972 | Redmore | 260/286 A X |
| 3,694,144 | 9/1972 | Redmore | 21/2.7 A |
| 3,711,404 | 1/1973 | Redmore | 252/8.55 E |
| 3,720,498 | 3/1973 | Redmore | 21/2.5 A |
| 3,775,057 | 11/1973 | Redmore | 21/2.5 A |
| 3,803,048 | 4/1974 | Hura | 21/2.7 A X |
| 3,809,694 | 5/1974 | Redmore | 260/286 A |
| 3,810,907 | 5/1974 | Redmore | 260/297 P |

*Primary Examiner*—Barry S. Richman
*Attorney, Agent, or Firm*—Sidney B. Ring; Hyman F. Glass

[57] ABSTRACT

Process of inhibiting corrosion of ferrous metals by corrosive media comprising treating the metal with full nitrogen heterocyclic phosphonic compounds wherein the phosphonic group is ortho- or para- to the nitrogen heterocyclic group, or on an adjacent ring, where the compounds have a cyclic structure which may consist of a single cyclic structure or several cyclic structures attached to each other. Said nitrogen heterocyclic phosphonic compounds are prepared by reacting an aromatic nitrogen-heterocyclic compound, wherein the nitrogen atom is in the form of a quaternary alkoxy derivative with a phosphite salt in the form of an ester of the phosphite. These compounds which may be characterized as phosphinic compounds of nitrogen-heterocyclics have many uses including their use as biocides, such as bacteriocides, herbicides, corrosion inhibitors, chelating agents, etc.

7 Claims, No Drawings

USE AS CORROSION INHIBITORS: PHENANTHRIDINE PHOSPHONIC COMPOUNDS

Continuation-in-part of Ser. No. 173,296 filed Aug. 19, 1971, now U.S. Pat. No. 3,755,057, which is a division of Ser. No. 801,856 filed Feb. 24, 1969, now U.S. Pat. No. 3,673,196.

This invention relates to nitrogen-heterocyclic phosphonic compounds. More particularly this invention relates to nitrogen-heterocyclic phosphonic compounds wherein the phosphonic group is ortho or para to the heterocyclic nitrogen group or on an adjacent ring. Still more particularly, this invention relates to compounds characterized by the following groups:

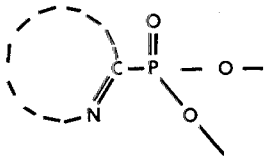

(ortho substituted)

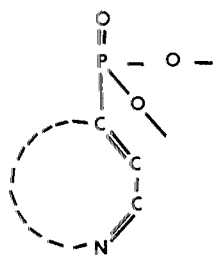

(para substituted)

wherein the dotted lines indicate a cyclic structure, which cyclic structure may be the sole cyclic structure or may be attached to other cyclic groups. These compounds may be characterized as phosphonic compounds of nitrogen heterocyclics.

This invention also relates to the preparation of these phosphonic compounds which comprises reacting an aromatic nitrogen-heterocyclic, wherein the nitrogen atom is in the form of a quaternary alkoxy derivative (N-OR), with a phosphite salt, preferably in the form of an ester of the phosphite, as exemplified by the following equation:

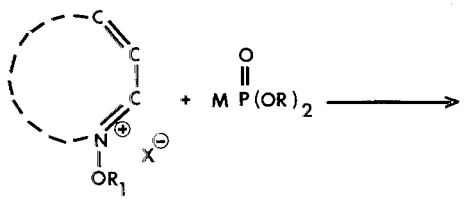

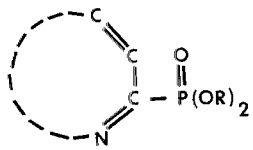

and/or

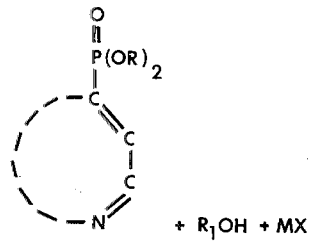

$+ R_1OH + MX$

This invention also relates to uses for these compounds for example as biocides, such as bacteriocides, herbicides, corrosion inhibitors, chelating agents, etc.

In my application Ser. No. 733,328 filed May 31, 1968, and now abandoned, there are described and claimed processes for preparing dihydro nitrogen heterocyclic phosphonates and the resulting phosphonates which are substituted ortho and/or para to the heterocyclic nitrogen atom, etc. For example, the invention of Ser. No. 733,328 may be illustrated by the following equations:

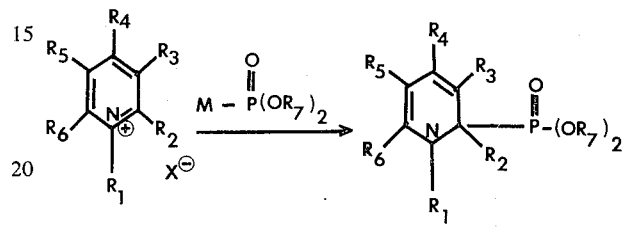

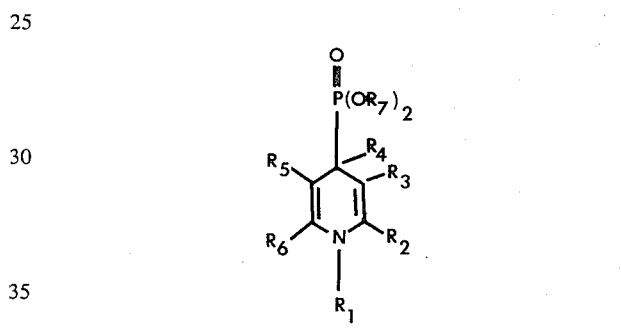

$R_1$, $R_2$, $R_3$, $R_4$, $R_5$, $R_6$ may be hydrogen or a substituted group, for example, alkyl, cycloalkyl, aryl, alkaryl, aralkyl, etc.

$R_7$ is an ester moiety for example alkyl, aryl, cycloalkyl, aralkyl, alkaryl, etc. oxyalkylated groups, etc.

The groups of $R_1$ to $R_7$ may also be further substituted provided the substituted groups do not interfere with the reaction.

X is any suitable anion, for example, halogen, e.g. chlorine, bromine, iodine, etc., $-SO_4R$, $-SO_3R$ where R is alkyl, etc., such as $-SO_4Me$, $-SO_4Et$,

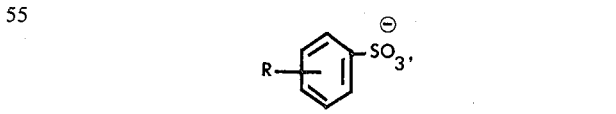

etc.

The present invention relates to a process of preparing analogous nitrogen heterocyclic phosphonic compounds as contrasted to the dihydro-heterocyclic phosphonates of Ser. No. 733,328 (i.e. full heterocyclic as contrasted to dihydro-heterocyclic).

The present invention may be illustrated by the following equations:

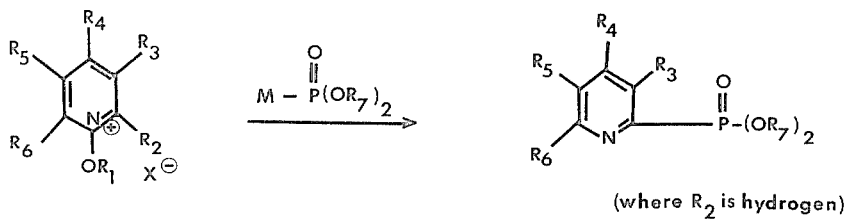

(where R₂ is hydrogen)

and/or

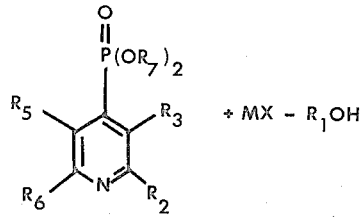

(where R₄ is hydrogen)

where $R_1$ is a hydrocarbon group such as alkyl, cycloalkyl, aryl, aralkyl, alkaryl, etc., $R_2$, $R_3$, $R_4$, $R_5$, $R_6$ is hydrogen or a substituted group, for example, alkyl, cycloalkyl, aryl, alkaryl, aralkyl, etc.

$R_7$ is an ester moiety for example alkyl, aryl, cycloalkyl, aralkyl, alkaryl, etc. oxyalkylated groups, etc.

The groups of $R_1$ to $R_7$ may also be further substituted provided the substituted groups do not interfere with the reaction.

X is any suitable anion, for example, halogen, e.g. chlorine, bromine, iodine, etc., — $SO_4R$, —$SO_3R$, where R is alkyl, such as —$SO_4Me$, —$SO_4Et$,

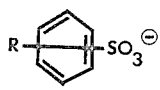

etc.

It is to be noted that in the invention described in Ser. No. 733,328 the $R_1$ group remains affixed to the heterocyclic nitrogen throughout the reaction and in the final product, thus yielding a dihydro derivative of a heterocyclic compound; whereas in the present invention the nitrogen bonded $OR_1$ group is removed as an alcohol moiety during the reaction to yield the heterocyclic compound itself.

In preparing the compounds of this invention it is convenient to start with nitrogen-heterocyclic compound, oxidize it to the N-oxide, react this with an alkyl ester of an inorganic acid such as alkyl halide, alkyl sulfate, etc. to form the $OR_1$ group, and to then react the salt of a phosphite ester to yield the heterocyclic phosphonic compound as illustrated by the following series of reactions:

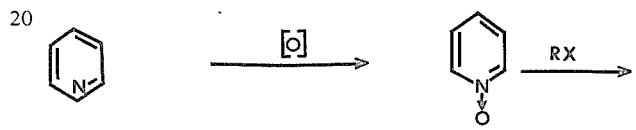

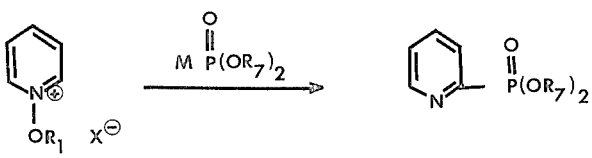

and/or

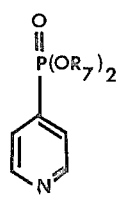

Any nitrogen heterocyclic having an available ortho and/or para position capable of being activated by quaternary formation of the nitrogen group with an —$OR_1$ group so as to promote reaction with salts of phosphite esters can be employed. This includes heterocyclics having one or more rings, where at least one ring has a nitrogen heterocyclic group and the other rings are carbocyclic or heterocyclic, i.e., they may contain oxygen or other non-carbon elements in the ring, etc. for example,

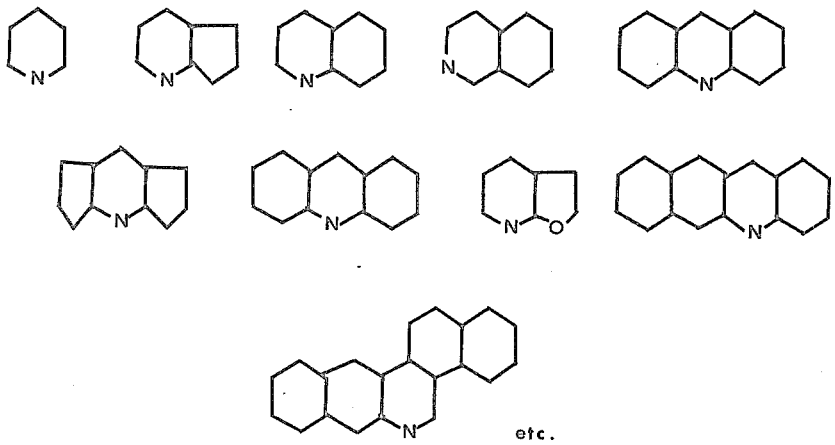

etc.

The above ring systems may also be substituted. The adjacent rings may also contain heterocyclic groups for example oxygen, nitrogen, etc., and/or may contain rings having less than six molecules in the ring for example a 5 member ring.

In certain instances more than one nitrogen heterocyclic ring may be capable of reacting with the phosphite salt so that phosphonic substitution may occur in more than one ring.

X is any suitable anion, for example, halogen, e.g. chlorine, bromine, iodine, etc., —SO$_4$R, —SO$_3$R where R is alkyl such as —SO$_4$⁻Me, —SO$_4$⁻Et,

etc.

Representative examples of heterocyclic reactants include pyridines and benzo- and dibenzo- derivatives of pyridine, for example, pyridine, alkylated pyridines such as 2-picoline, 3-picoline, 4-picoline, etc., 2,4-lutidine, 2,6-lutidine, 2,3-lutidine, etc., collidines, etc. quinoline and alkylated quinolines, etc. isoquinolines, and alkylated isoquinolines, etc. phenanthridines, and substituted phenanthridines, etc., acridines and substituted acridines, etc.

The nitrogen group in the heterocyclic ring is reacted with a quaternizing agent to activate the ring.

The phosphorous-containing reactant is a metal salt of phosphorous acid, preferably in the form of an alkali metal salt in which the metal is directly bonded to phosphorous. In order to prevent undesirable side reactions the phosphorous acid is used in the form of a derivative, preferably as a diester.

Where the phosphite ester contains more than one phosphite unit, a plurality of heterocyclic units may be joined thereto, for example

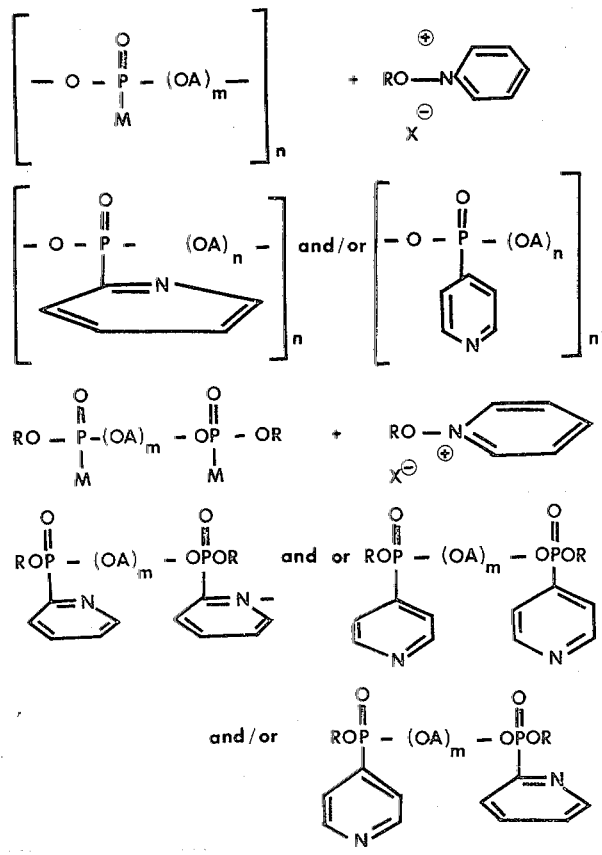

In general, the reaction is carried out in an inert solvent which is water free at a temperature and time sufficient to promote the desired reaction. Ether solvents such as diethyl ether, dioxane and tetrahydrofuran are useful as well as aromatic hydrocarbon solvent like benzene, toluene, etc. Particularly useful are dipolar aprotic solvents such as dimethyl sulfoxide, dimethyl formamide N-methyl pyrrolidone. Combinations of these various types of solvents can also be advantageously used. Temperature and time are interrelated. Thus, a temperature of from 30° to the decomposition temperature of reactants and products can be employed, the upper limit of temperature being generally about 150°C., for a time of from 0.5 – 10 hours but preferably 1 – 3 hours. The inorganic salt is separated from the organic layer by filtration or by water extraction and the phosphonate derivative is separated from the organic layer. In addition the reaction is best carried out on an inert atmosphere such as nitrogen, argon, etc. In this way the attack of oxygen on phosphite salts and on the products is prevented.

The following examples are presented by way of illustration and not of limitation.

EXAMPLE 1

Diethyl Pyridine 2-phosphonate

To pyridine N-oxide (19g; 0.2 mole) was added dimethyl sulfate (25.2g; 0.2 mole) during 30 minutes. The reaction was completed by heating at 100°C. for 2 hours yielding N-methoxy pyridinium methosulfate. Diethyl sodio phosphonate was prepared by dissolving sodium (4.6g; 0.2 mole) in a solution of diethyl phosphite (27.6g; 0.2 mole) in dioxane (100 ml) in an argon atmosphere. The N-methoxy pyridinium quaternary was suspended in toluene by stirring while the diethyl sodio phosphonate solution was added. The reaction flask was cooled to maintain the temperature at 25° – 35°C. After stirring for 1½ hours water (100 ml) was added and the organic product isolated by chloroform extraction. Evaporation of the chloroform extract and distillation yielded diethyl pyridine-2-phosphonate with a small amount of diethyl pyridine 4-phosphonate. Yield — 14g (33%) bp 140° – 8°C./1.5 mm. The presence of the two isomers was established by infrared absorption; 2 -isomer 13.3μ (strong, 4 adjacent hydrogen) and 4 isomer, 12.3μ (weak, 2 adjacent hydrogen).

EXAMPLE 2

Diethyl 4-methyl Pyridine-2-Phosphonate

N-methoxy-4-methyl pyridinium methosulfate was prepared from 4-picoline-N-oxide (54.4g; 0.5 mole) and dimethyl sulfate (63g; 0.5 mole) and suspended by stirring with toluene (250 ml). To this suspension was added diethyl sodio phosphonate in dioxane (150 ml) prepared from diethyl phosphite (69g; 0.5 mole) and sodium (11.5g; 0.5 mole). This addition was carried out in 40 minutes during which time the temperature was controlled at 45°C. by cooling. After stirring for 1 hour water was added to the reaction and the product isolated by chloroform extraction. Evaporation and distillation yielded diethyl 4-methyl pyridine-2-phosphonate 17g; bp 109°–112°0.05 mm. The infrared spectrum shows absorption at 7.97μ (P=O), 9.8μ and 10.4μ (P—O—C).

EXAMPLE 3

Diethyl Quinoline-2-Phosphonate and -4-Phosphonate

N-methoxyquinolinium methosulfate was prepared from quinoline N-oxide (50g; 0.344 mole) and dimethyl sulfate (43.5g; 0.344 mole). To this quaternary was added diethyl sodiophosphonate from diethyl phosphite (47.5g; 0.344 mole) and sodium (7.9g; 0.344 mole) in dioxane (100 ml.). The reaction was completed by heating at 100° – 110°C. for 2 hours. Water was added to the reaction, after cooling, and the product was isolated by benzene extraction. Evaporation of the solvent and heating under vacuum at 140°C./2 mm gave a residue which was a mixture of diethyl quinoline 2-phosphonate and 4-phosphonate. Analysis found N = 5.4% calculated N, 5.28%.

EXAMPLE 4

Diethyl Isoquinoline -1- Phosphonate

N-methoxy isoquinolinium methosulfate was converted by reaction with diethyl sodio phosphonate in dioxane into diethyl isoquinoline-1-phosphonate in 30% yield using the procedure of Example 3. The product was purified by distillation bp 135° – 140°C./0.15 mm.

EXAMPLE 5

Diethyl 4-Cyanopyridine -2- Phosphonate 4-cyano pyridine N-oxide was converted into its N-methoxy pyridinium salt with dimethyl sulfate and reacted in dioxane with diethyl sodio phosphonate by heating at 80° – 85°C. for 1 hour. After cooling, water was added and the product isolated by chloroform extraction. Removal of unreacted reactants under vacuum left the slightly impure diethyl 4-cyano pyridine-2-phosphonate (70%). The infrared spectrum showed absorption at $4.5\mu$ ($C \equiv N$), $7.95\mu$ ($P=O$), $9.8\mu$ ($P-O-C$).

EXAMPLE 6

4-Methyl Pyridine -2- Phosphonic Acid

Diethyl 4-methyl pyridine -2-phosphonate (11g.) (The product from Example 2) was heated for 6 hours with 18% hydrochloric acid (120 ml) at 100°. The acid was removed under vacuum to leave a gum which was dissolved in ethyl alcohol. Addition of ether yielded white crystals which after drying gave pure 4-methyl pyridine -2- phosphonic acid (7.2g; 86%) mp 272°–6°C.

| | |
|---|---|
| Analysis Calculated | C, 41.62, H, 5.78, N, 8.09, P, 17.92% |
| Found | C, 41.65; H, 4.63; H, 8.09; P, 16.95% |

EXAMPLE 7

Quinoline 2- and -4-Phosphonic Acids

The product of Example 3 (7.7g) was heated under reflux for 3½ hours with 18% hydrochloric acid (60 ml.). Using the isolation procedure of Example 6 a crude quinoline phosphonic acid 5g. (82%) was isolated. Crystallization from acetic acid gave pure quinoline -2- phosphonic acid mp 200°C.

| | |
|---|---|
| Analysis Calculated | N, 6.70%; P, 14.83%. |
| Found | N, 6.33%; P, 14.71%. |

As is quite evident, other nitrogen heterocyclics and phosphites are useful in my invention. It is, therefore, not only impossible to attempt a comprehensive catalogue of such compounds, but to attempt to describe the invention in its broader aspects in terms of specific heterocyclics and phosphites reacted would be too voluminous and unnecessary since one skilled in the art could by following the description of the invention herein select a useful reactant. This invention lies in the reaction of suitable heterocyclics and phosphites and their individual compositions are important only in the sense that they react to form useful products. To precisely define each specific useful heterocyclic in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific heterocyclics suitable for this invention. In analogy to the case of a machine, wherein the use of certain materials of construction or dimensions of parts would lead to no practical useful result, various materials will be rejected as inapplicable where others would be operative. I can obviously assume that no one will wish to use a useless heterocyclic nor will be misled because it is possible to misapply the teachings of the present disclosure to do so. Thus, any heterocyclic that can react as stated herein can be employed. Similarly any nitrogen heterocyclic phosphonic compound which is within the scope of this invention and effective as a corrosion inhibitor (as hereinafter stated) is within the scope of this invention.

USE AS CORROSION INHIBITORS

This phase of this invention relates to the use of the present compounds in inhibiting the corrosion of metals, most particularly iron, steel and ferrous alloys. These compounds can be used in a wide variety of applications and systems where iron, steel and ferrous alloys are affected by corrosion. They may be employed for inhibiting corrosion in processes which require this protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle. The corrosion preventive reagent is dissolved in the liquid corrosive medium in small amounts and is thus kept in contact with the metal surface to be protected. Alternately, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and the producing tubing where it becomes comingled with the fluid in the well and is pumped or flowed from the well with these fluids, thus contacting the inner wall of the casing, the outer and the inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "bole weevil" device or similar arrangement. Where the inhibitor is a solid, it may be dropped into the well as a solid lump or stock, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below by the casing. In such wells the reagent may be introduced into the tubing through a pressure equalizing vessel, after stopping the flow of fluids. After being so treated the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For example, for the protection of gas wells and gas-condensate wells, the amount of corrosion inhibitor used might range between about one-fourth to 3 lbs. more per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

These compounds can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well". The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system". If the water is recirculated in a closed system without substantial aeration, the secondary recovery method is referred to herein as a "closed water flooding system".

Because of the corrosive nature of oil field brines, to economically produce oil by water flooding, it is necessary to prevent or reduce corrosion since corrosion increases the cost thereof by making it necessary to repair and replace such equipment at frequent intervals. These compositions can be employed in preventing corrosion in systems containing a corrosive aqueous media, and most particularly in systems containing brine, which is characterized by employing the phosphonic compound described herein. For example, they can be employed in an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed by injecting the water into permeable low pressure strata below the fresh water level. The formation into which the water is injected is not the oil producing formation and this type of disposal is defined as salt water disposal or waste water disposal. The problems of corrosion of equipment are analogous to those encountered in the secondary recovery operation by flooding. The compositions of this invention can also be used in such water disposal wells thus providing a simple and economical method of solving the corrosion problems encountered in disposing of unwanted water.

Water flood and waste disposal operations are too well known to require further elaboration. In essence, the flooding operation is effected in the conventional manner except that the flooding medium contains a minor amount of these compounds, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bacteriocides which prevent the formation from becoming plugged through bacterial growth, tracers, etc. Similarly, they may be employed in conjunction with any of the operating techniques commonly employed in water flooding, peripheral flooding, etc. and in conjunction with other secondary recovery methods.

The concentration of the corrosion inhibitors of this invention will vary widely depending on the particular compound, the particular system, etc. Concentrations of at least about 0.25 ppm, such as about 0.75 to 7,500 ppm for example about 1 to 5,000 ppm, advantageously about 10 to 1,000 ppm, but preferably about 15 – 250 ppm may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition.

Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

These compounds can also be employed in conjunction with other corrosion inhibitors, for example, of the film-forming type. Non-limiting examples include the acylated polyamines such as described in U.S. Pat. Nos. Re. 23,227, 2,466,517, 2,468,163, 2,598,213 and 2,640,029. These acylated polyamines may be described as amides, imidazolines, tetrahydropyrimidines, etc.

EXAMPLES

The heterocyclic phosphonic compounds of this invention, particularly those of Examples 1 through 7, when tested exhibited corrosion inhibiting properties.

PHENANTHRIDINE EXAMPLES AND CORROSION TESTS

EXAMPLE 10

Diethyl phenanthridine-6-phosphonate

Phenanthridine N-oxide (39g; 0.2 mole) was suspended in diethyl phosphite (130 ml) while dimethyl sulfate (25.4g) was added. The reaction was completed by warming at 35°–45° for 2 hrs. The mixture was cooled to 10° and a solution of sodium (4.6g) in diethyl phosphite (100 ml) was added at 10°–15° in 30 mins. The mixture was stirred overnight at room temperature. The product was isolated by addition of water and extraction with chloroform. Crystallization from benzene/hexane gave diethyl phenanthridine-6-phosphonate (65%).

Example 11

Phenanthridine-6-phosphonic acid

Diethyl phenanthridine-6-phosphonate (10g) was under reflux for 6 hrs. with 18% HCl (250 ml) during which time the ester gradually dissolved. Evaporation of the aqueous acid yielded crude acid which was purified by crystallization from water.

Example 12

Diethyl-6-methyl phenanthridine-2-phosphonate and Isomers

6-Methylphenanthridine-N-oxide (19g) was converted into the corresponding N-methoxy derivative by reaction with dimethyl sulfate (13g) in diethylphosphite at 30°–50°. To this N-methoxy quaternary was added sodiodiethylphosphonate (0.1 mole) in diethyl phosphite (75 ml) at 10°–15°. After stirring at room temperature overnight water was added to the reaction mixture and the product isolated by chloroform extraction. The product appeared to consist of a mixture of isomers with diethyl 6-methylphenanthridine-2-phosphonate the predominate product.

Corrosion tests were made using sand blasted 1020 mild steel coupons monitored by a polarization resistance meter, a PAIR instrument described in U.S. Pat. No. 3,406,101. These tests were made in cylindrical containers of 1500 cc volume with provision for constant stirring by means of a motor driven impeller. A thermostatically controlled immersion heater maintained an average temperature of 75°C. and an air inlet kept the fluids constantly saturated with air. Between each test the cylinder was cleaned with steam, benzene, acetone and thoroughly washed with clean water. Results of these corrosion tests are shown in the following Table.

Protection is calculated in the usual manner from corrosion rate ($R_1$) of fluids without inhibitor and corrosion rate ($R_2$) in presence of particular inhibitor according to the formula $$\frac{R_1 - R_2}{R_1} \times 100 = \text{Percent protection.}$$

TABLE

Corrosion Results in Laboratory Brine
(4.2% NaCl, 1.7% MgCl$_2$, 0.15% CaCl$_2$, 0.09% Na$_2$SO$_4$, pH 6.0)

| Product of Example | Concentration | Protection |
| --- | --- | --- |
| 10 | 1000 ppm | 42% |
| 12 | 1000 ppm | 49% |
| Mercaptobenzothiazole | 1000 ppm | 30% |

OTHER USES

In addition to the uses described above, these compositions and/or derivatives thereof, can be used as follows:

1. as demulsifiers for O/W and W/O emulsions
2. as biocides i.e. bacteriocides, algicides, etc.
3. as additives to various petroleum fuels including gasoline, diesel fuel, jet fuels, etc.
4. as gasoline anti-icers and anti-stallers
5. as additives for sludging oil and cutting oils
6. as agents for the textile industry such as mercerizing assistants, wetting agents, rewetting agents, penetrating agents, dispersing agents, softening agents, dyeing assistants, etc.
7. as anti-static agents for textile, plastics, etc.
8. as lube oil additives
9. as emulsifiers for insecticidal and agricultural compositions
10. as flocculants, particularly as flocaids
11. scale inhibitors

I claim:

1. A process of inhibiting corrosion of ferrous metals by corrosive media which comprises contacting said metal with a full nitrogen heterocyclic phosphonic compound or mixtures of full nitrogen heterocyclic phosphonic compounds wherein the nitrogen heterocyclic group is a phenanthridine group having an unsaturated bond between the nitrogen atom and one adjacent carbon atom and a saturated bond between the nitrogen atom and the other adjacent carbon atom and the phosphorus atom of the phosphonic group is bonded directly to a carbon atom of said phenanthridine group and said phosphonic group is ortho to the nitrogen atom on said phenanthridine group or on an adjacent ring.

2. The process of claim 1 wherein the phosphonic group is

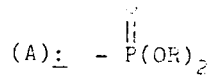

wherein R is hydrogen, alkyl, aryl, cycloalkyl, aralkyl and alkaryl or

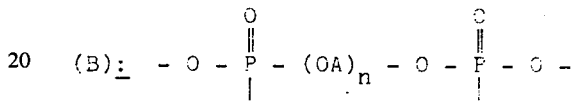

wherein OA is an oxyalkylated group and $n$ is at least 1.

3. The process of claim 2 wherein the phosphonic group is

4. The process of claim 3 wherein the compound is phenanthridine-6-phosphonic acid.

5. The process of claim 3 wherein the nitrogen heterocyclic group is an alkylated phenanthridine group.

6. The process of claim 5 wherein the compound is diethyl phenanthridine-6-phosphonate.

7. The process of claim 5 wherein the compound is diethyl-6-methylphenanthridine-2-phosphonate.

* * * * *